United States Patent [19]

Goor

[11] Patent Number: 5,375,908
[45] Date of Patent: Dec. 27, 1994

[54] INTEGRAL INFLATABLE OCCUPANT RESTRAINT SYSTEM

[75] Inventor: Dan Goor, Colorado Springs, Colo.

[73] Assignee: Goor Associates, Inc., Colorado Springs, Colo.

[21] Appl. No.: 27,704

[22] Filed: Mar. 8, 1993

Related U.S. Application Data

[63] Continuation-in-part of Ser. No. 2,334, Jan. 8, 1993.

[51] Int. Cl.$^5$ .............................................. B60R 21/20
[52] U.S. Cl. ............................. 297/216.11; 297/488; 297/256.15
[58] Field of Search ............... 297/472, 216.1, 216.11, 297/250.1, 256.15, 464, 486–488, 466, DIG. 3, 452.34, 452.35, 452.36, 284.1, 284.6; 280/733, 751

[56] References Cited

U.S. PATENT DOCUMENTS

| | | | |
|---|---|---|---|
| B 767,002 | 10/1973 | Gillund | 180/102 |
| B 520,341 | 3/1976 | Abe et al. | 280/150 |
| 3,430,979 | 3/1969 | Terry et al. | 280/150 |
| 3,510,150 | 5/1970 | Wilfert | 280/733 |
| 3,672,699 | 6/1972 | DeWindt | 280/150 AB |
| 3,706,462 | 12/1972 | Lilly | 280/150 |
| 3,706,463 | 12/1972 | Lipkin | 280/150 |
| 3,844,581 | 10/1974 | Fox | 280/150 |
| 3,866,940 | 2/1975 | Lewis | 280/150 |
| 3,883,053 | 5/1975 | Pritchard et al. | 224/5 |
| 3,905,615 | 9/1975 | Schulman | 282/190 |
| 3,951,450 | 4/1976 | Gambotti | 297/238 |
| 3,971,569 | 7/1976 | Abe et al. | 280/733 |
| 3,975,037 | 8/1976 | Hontschik et al. | 280/733 |
| 3,985,374 | 10/1976 | Powaska | 280/730 |
| 4,166,641 | 9/1979 | Okada et al. | 280/735 |
| 4,230,366 | 10/1980 | Ruda | 297/216.1 X |
| 4,348,037 | 9/1982 | Law et al. | 280/733 |
| 4,360,223 | 11/1982 | Kirchoff | 280/729 |
| 4,533,176 | 8/1985 | Wyttenbach | 297/238 |
| 4,632,460 | 12/1986 | Meeker et al. | 297/467 |
| 4,662,683 | 5/1987 | Kyoedler et al. | 297/487 X |
| 4,664,443 | 5/1987 | Casale | 297/238 |
| 4,690,455 | 9/1987 | Bailey et al. | 297/238 |
| 4,715,617 | 12/1987 | Breed | 280/731 |
| 4,738,489 | 4/1988 | Wise et al. | 297/487 |
| 4,797,229 | 6/1988 | Dorto | 297/238 |
| 4,834,420 | 5/1989 | Sankrithi et al. | 297/250.1 X |
| 4,883,320 | 11/1989 | Izumida et al. | 297/284.1 X |
| 4,946,191 | 8/1990 | Putsch | 280/730 |
| 4,971,354 | 11/1990 | Kim | 280/733 |
| 5,022,709 | 6/1991 | Marchino | 297/452.36 X |
| 5,062,662 | 11/1991 | Cameron | 280/733 |
| 5,106,158 | 4/1992 | Dukatz et al. | 297/396 |

FOREIGN PATENT DOCUMENTS

| | | | |
|---|---|---|---|
| 2046426 | 3/1972 | Germany | 280/733 |
| 8807947 | 10/1988 | WIPO | 280/733 |

OTHER PUBLICATIONS

Instruction Manual entitled: "Restraint Systems" 8M-1 (No Date).

Primary Examiner—Kenneth J. Dorner
Assistant Examiner—Milton Nelson, Jr.
Attorney, Agent, or Firm—Weingarten, Schurgin, Gagnebin & Hayes

[57] ABSTRACT

An inflatable restraint system for providing protection to an occupant in a moving vehicle including a module disposed adjacent to the chest area of the vehicle occupant, the module having an airbag and a high pressure gas generator for exerting a controlled force against the occupant in a direction opposite the direction of motion of the occupant caused by rapid deceleration of the vehicle while simultaneously inflating the airbag adjacent to the occupant. A second embodiment is disclosed which includes an ancillary module disposed adjacent to the rear base of the occupant's neck, providing an airbag for inflation behind the occupant's head while simultaneously exerting a force opposite the direction of motion of the occupant's head, as caused by the backlash forces acting against the occupant following initial impact of the occupant with a forward airbag. A third embodiment is disclosed wherein an airbag is incorporated into a child safety seat providing protection from frontal and lateral impact. A fourth embodiment is disclosed for rear seat passenger protection. A fifth embodiment is disclosed wherein an adult passenger seat is convertible into a child safety seat that can incorporate an airbag.

15 Claims, 11 Drawing Sheets

INTEGRAL INFLATABLE OCCUPANT RESTRAINT SYSTEM

CROSS REFERENCE TO RELATED APPLICATIONS

This invention is a continuation-in-part of patent application Ser. No. 08/002,334, filed Jan. 8, 1993, entitled "Integral Inflatable Occupant Restraint System".

FIELD OF THE INVENTION

The present invention relates generally to passive vehicle restraint systems and, more specifically, to an integral inflatable occupant restraint system.

BACKGROUND OF THE INVENTION

Various vehicle safety devices and passenger restraint systems are known in the art for protecting the occupants of a vehicle in the event of an accident. Most recently, automobile manufacturers have begun to provide one or more inflatable airbags in the passenger compartment of a vehicle for nearly instantaneous inflation upon rapid deceleration of the vehicle, as caused by a collision. Such airbags provide a cushioned barrier between the occupant and the fixed surroundings of the vehicle passenger compartment for absorbing the forces exerted on the occupant in the collision.

Typically, the airbags of such prior art systems are mounted in various fixed locations in the passenger compartment of the vehicle such as the steering wheel, dashboard or the back panel of a seat (for rear seat passengers). In this configuration, it is necessary for the occupant to be positioned directly in alignment with the position where the airbag is mounted in order to provide effective protection to the occupant. This requirement presents a nuisance to the occupant and may actually create a safety risk in cases where the occupant is not positioned directly in front of the airbag when it is inflated.

Other inflatable safety systems have been designed for being disposed adjacent to the vehicle occupant, on a restraining belt, as shown in U.S. Pat. Nos. 3,430,979 and 3,706,462 and in the case of U.S. Pat. No. 4,834,420 a child seat. These systems are designed to provide increased mobility for the occupant while maintaining effective protection thereof by deploying an inflatable cushion adjacent to the occupant in the event of an accident.

Inflatable restraint devices known in the art provide a cushion for absorbing the forces imparted to the occupant in the event of an accident, but do not provide any means for opposing the forces imparted to the occupant at the instant of rapid deceleration of the vehicle. By providing a system for opposing the forces imparted to the occupant, the destructive forces of a collision can be distributed over time and the forces absorbed by the occupant at the point of impact with the airbag can be reduced. Thus, it would be advantageous to provide an occupant restraint system that actually provides a controlled force against the occupant to oppose the motion of the occupant caused by the rapid deceleration of the vehicle while deploying an airbag, thereby reducing the magnitude of the force absorbed by the occupant at the point of impact with the airbag.

SUMMARY OF THE INVENTION

The present invention discloses an inflatable restraint system including a restraint module for being disposed adjacent to the chest area of a vehicle occupant to provide an inflatable shock absorbing cushion adjacent to the occupant while simultaneously exerting a controlled force against the occupant in a direction opposite the direction of motion of the occupant. Accordingly, the restraint system of the present invention includes a module housing an inflatable bag and a controlled high pressure gas generator, providing an explosive force upon extremely rapid deceleration or a crash of the vehicle, to deploy the inflatable bag adjacent to the vehicle occupant and to simultaneously generate a reactionary force against the occupant. The reactionary force created by the high pressure gas generator of the invention generates a controlled force against the occupant in a direction opposite the direction of motion of the occupant, thereby increasing the amount of time before the occupant impacts with the inflatable bag and decreasing the magnitude of the force absorbed by the occupant at the moment of impact with the airbag. Embodiments of present invention are disclosed which are useful in protecting against both frontal and lateral impact in either the front or rear seat, as well as an embodiment for a child seat. Other embodiments disclose a preinflated cushion within the inflatable bag which accelerates bag inflation and provides back-up cushioning in the event of system failure. Still another embodiment provides an adult passenger seat that is convertible to a child safety seat and which can incorporate an airbag. Yet another embodiment provides a biased restraining cushion or rail secured to a child safety seat that acts cooperatively with the inflation of an airbag to reduce the intensity of impact forces on the child seat occupant.

DESCRIPTION OF THE DRAWINGS

Other features and advantages of the invention will be apparent from the following detailed description of the invention in conjunction with the accompanying drawings, in which.

DETAILED DESCRIPTION OF THE INVENTION

Figure 1:
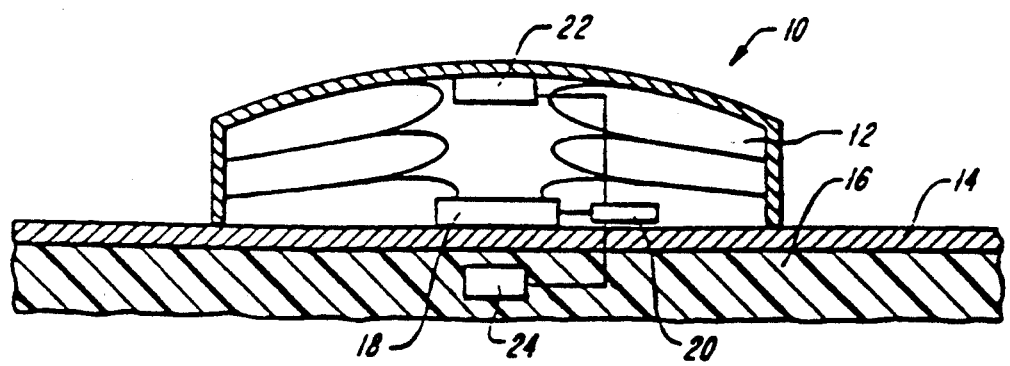
FIG. 1 is a cross-sectional view of the restraint module of the present invention.

Referring now to FIG. 1, the airbag restraint system of the present invention is embodied in a restraint module 10 including an airbag 12, shown in its collapsed state, mounted on a rigid membrane 14 adjacent to a protective cushion 16. A high pressure gas generator 18 is mounted within the module 10, adjacent to the rigid membrane 14 and coupled to an energy source 20 via a motion sensor 22. In addition, or alternatively, the high pressure gas generator 18 is also coupled to a pressure sensor 24 embedded in the protective cushion 16 and/or an impact sensor 26 (shown in FIG. 2) located on the vehicle in which the occupant is seated.

Figure 2:
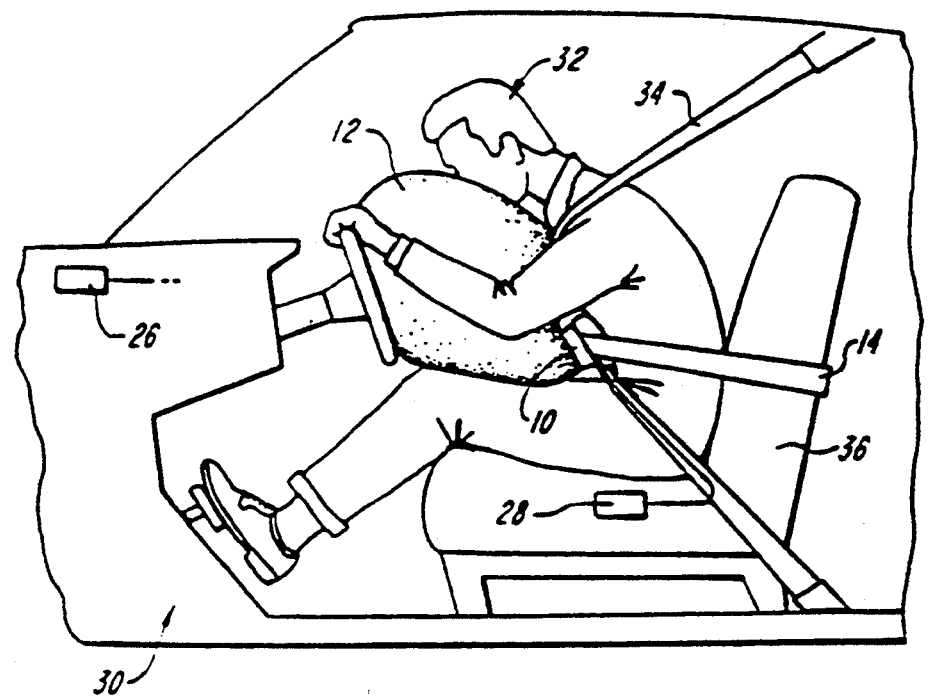
FIG. 2 is a side view showing the occupant restraint system of the present invention in its deployed state.

The module 10 is preferably a stand-alone module which can be mounted on a restraining harness in a vehicle, as shown in FIG. 2, or can be disposed on a vest worn by the vehicle occupant. This stand-alone feature allows the flexibility to manufacture and distribute customized airbag restraint systems in accordance with the invention, providing maximum individual comfort and protection for each individual depending on the size and weight of the individual.

Referring now to FIG. 2, there is shown a vehicle 30 with an occupant 32 seated within a shoulder harness 34 in a seat 36. The occupant restraint system of the present invention is shown in its deployed state with airbag 12 inflated to provide an impact absorbing cushion between the occupant 32 and the interior of the vehicle 30. Although the occupant restraint system is shown in conjunction with an automobile, it is contemplated that the present invention can be adapted for use in various passenger vehicles including trains and airplanes.

In operation, the high pressure gas generator 18 is triggered upon very rapid deceleration or crash of the vehicle 30 to generate a transient explosive force. The transient force generated thereby is transmitted throughout the restraint module 10 to create a controlled force against the rigid membrane 14 in a direction opposite the forward motion of the vehicle occupant 32 caused by the rapid deceleration of the vehicle, while simultaneously deploying the airbag 12 from the restraint module 10 into the area immediately adjacent to the occupant 32. The high pressure gas generator 18 may take the form of one of various known systems which may include a self-contained $CO_2$ cartridge or some known chemical discharge mechanism.

High pressure gas generator 18 is triggered by an output signal generated by motion sensor 22, pressure sensor 24, or impact sensor 26, similar to those presently known and in use in the art. A redundant triggering system is contemplated wherein the motion sensor 22, detecting the occupant's rate of movement, the pressure sensor 24, detecting the pressure exerted by the occupant against the module 10, and the vehicle impact sensor 26, detecting vehicle integrity, are each coupled to the high pressure gas generator 18 for providing an output signal thereto.

Figure 3:
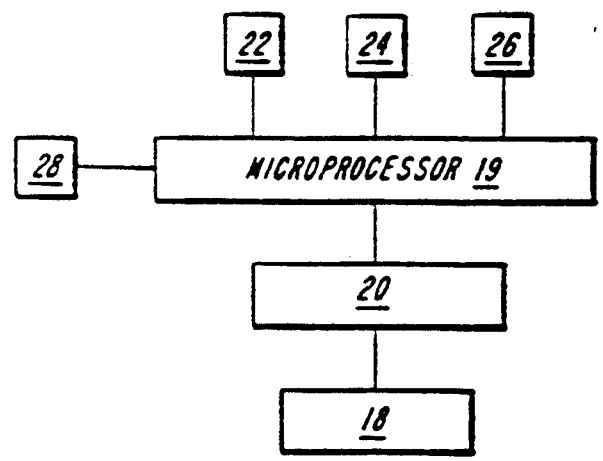
FIG. 3 is a block diagram of an interdependent sensing and arming system for triggering the present invention.

In the interest of providing a dependable deployment of the airbag 12 while preventing accidental deployment thereof, the sensors 22, 24, 26 can be configured to operate interdependently. For example, sensors 22, 24, 26 can be connected in series or can be coupled to the high pressure gas generator 18 via a microprocessor 19, in a configuration as shown in FIG. 3, wherein the microprocessor can be programmed so that the high pressure gas generator 18 will be triggered only if all three sensors 22, 24, 26 generate an output signal or if a combination of at least any two sensors detects a triggerable condition to generate an output signal. Of course, the restraint system can also be configured to be deployed in response to an output signal from a single sensor 22, 24, or 26.

An interlock arming system including a weight sensor 28 is also provided as a means for preventing accidental deployment of the airbag 12. The arming system is coupled to the high pressure gas generator 18 for detecting a predetermined weight, representing the presence of an occupant in the vehicle seat 36. This weight must be detected in order to "arm" the high pressure gas generator 18 so that it can be triggered by the sensors 22, 24, and/or 26. The interlock arming system may also include a manual switch which may be incorporated into a typical seat belt buckle. The interlock arming system can also be coupled to the microprocessor 19 triggering system, as shown in FIG. 3.

Figure 4:
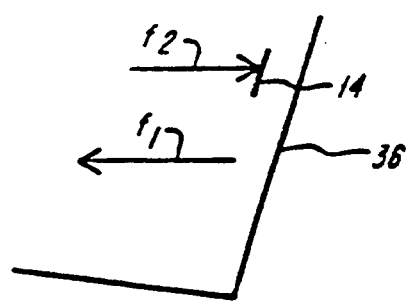
FIG. 4 is a schematic diagram showing the forces acting on the occupant at the moment that the present invention is deployed.

The advantages of the present invention can be best appreciated by representing the forces acting on the vehicle occupant 32 in schematic form as shown in FIG. 4. Force $f_2$ represents the reactionary force generated against the occupant 32 by the present restraint system. Force $f_2$ 2 is directly opposite the force $f_1$ created by the rapid deceleration of the vehicle 10. The representative forces shown in FIG. 4 can be further reduced to basic physical equations to provide an explanation of the advantages provided by the present invention.

In the following description, it is assumed that the distance d that an occupant 32 travels within the vehicle compartment as the result of rapid deceleration of the vehicle will be constant for a given occupant of mass m. In reality, the present invention may actually reduce the distance that the occupant 32 will travel, resulting in a further reduction of the force $f_1$ acting on the occupant 32. The approach presented herein offers a conservative mathematical analysis for illustrative purposes only.

It is given through the laws of physics that velocity v is equal to distance d divided by time t and that force F is equal to velocity v times mass m as expressed in the following mathematical equations, respectively:

$$v = d/t; \ d = vt \quad (1)$$

$$F = v \times m \quad (2)$$

Thus, the velocity and force generated by an occupant as it is accelerated in a rapidly decelerating vehicle is given by equations (1) and (2).

Applying a force $f_2$ in a direction opposing the acceleration of the occupant 32, as provided by the present invention, the time t that it takes for the occupant's body to travel the distance d from its position at rest to the point of impact with the airbag 16 is increased. Assuming the force exerted on the occupant 32 by the present invention increases the time to impact with the airbag by a factor of two, the velocity of the occupant's body utilizing the restraint system of the present invention becomes:

$$V_b = d/2t \quad (3)$$

Since the distance d that the occupant travels remains constant, equation (1) can be substituted into equation (3) to show that by using the restraint system of the present invention, the velocity $V_b$ of the occupant as it impacts the airbag is:

$$V_b = vt/2t = v/2 \quad (4)$$

Substituting the value for $V_b$ into the force equation:

$$F_b = V_b \times m = v/2 \times m = F/2 \quad (5)$$

Thus, it can be seen from this mathematical derivation that the force acting on an occupant 32 in a vehicle 10, during rapid deceleration thereof can be reduced in direct relationship to an increase in the amount of time to impact with the airbag 12. This increase in time is effected by the reactionary force generated by the restraint system of the present invention.

Figure 5:
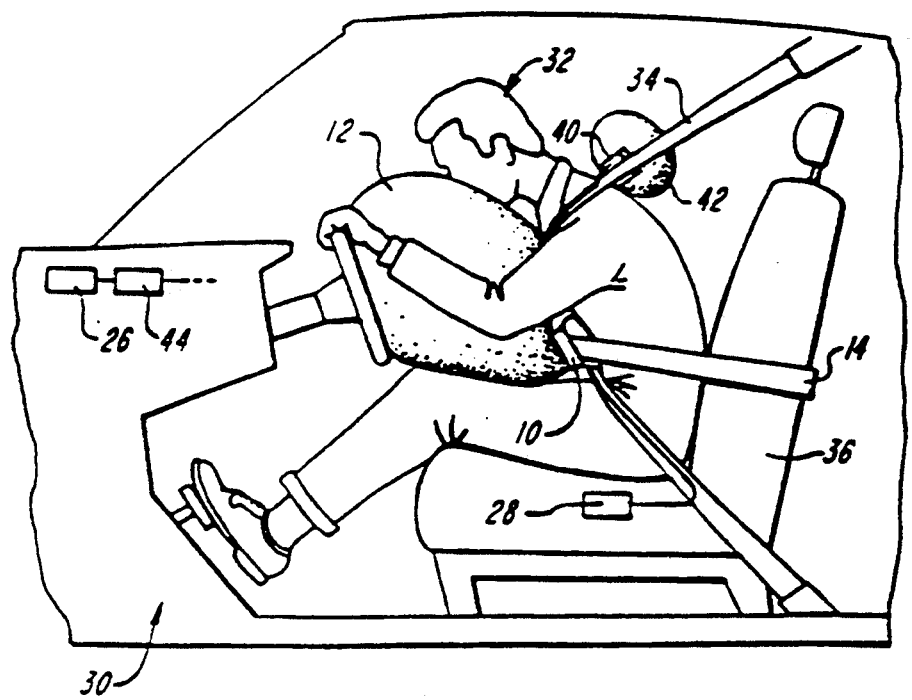
FIG. 5 is a side view showing an embodiment including a head protection restraint for use in conjunction with the forward airbag of the present invention.

A second embodiment of the present invention is illustrated in FIG. 5 wherein an ancillary restraint module 40 is positioned behind the base of the neck of the occupant 32. As in the embodiment described hereinabove, the ancillary restraint module 10 provides a reactionary force against the acceleration of the occupant's body while simultaneously deploying an airbag 42. In this embodiment, however, a delay mechanism 44 is coupled between the ancillary module 40 and the vehicle sensor 26 so that the ancillary module is triggered at a predetermined time after the triggering of the primary restraint module 10.

Figure 6:
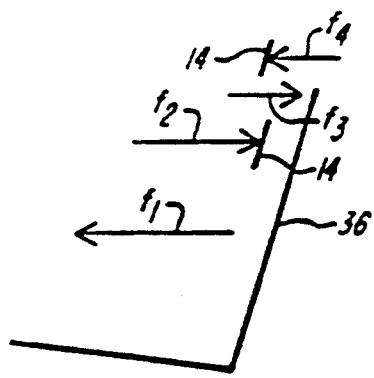
FIG. 6 is a schematic diagram showing the forces acting on the occupant in the embodiment of FIG. 5.

As shown in FIG. 6, this second embodiment generates a force $f_4$ to counteract the force $f_3$ acting on the occupant's head generated by the impact of the occupant 32 with the primary airbag 12. It follows, therefore, from the above mathematical derivation, that the reactionary force $f_4$ generated by the ancillary module 40 further reduces the forces exerted against the occupant's neck and thereby reducing whiplash effects on the occupant 32. The dual airbag system shown in FIG. 5 operates to dampen both the forward and rearward movement of the occupant in a severe accident, decreasing the impact forces acting on the occupant 32. The combination of reactionary forces $f_2$ and $f_4$ provided by this dual airbag system can be adapted to the mass and velocity of the occupant being protected that the present invention provides an adaptive restraining system which conforms to the severity of the forces acting on the occupant.

Figure 7:
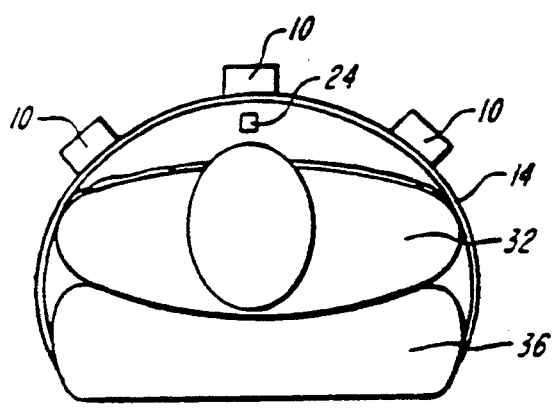
FIG. 7 is a top view viewing showing an embodiment of the present invention utilizing a plurality of restraint modules.

As shown in FIG. 7, the restraint system of the present invention can also be implemented via a plurality of restraint modules 10 disposed across the body of an occupant 32 along a rigid membrane 14, providing multiple independent airbags adjacent to the occupant. This configuration of multiple restraint modules 10 provides additional side protection to the occupant 32 as well as a distribution of the reactionary forces acting against the occupant 32.

Figure 8:
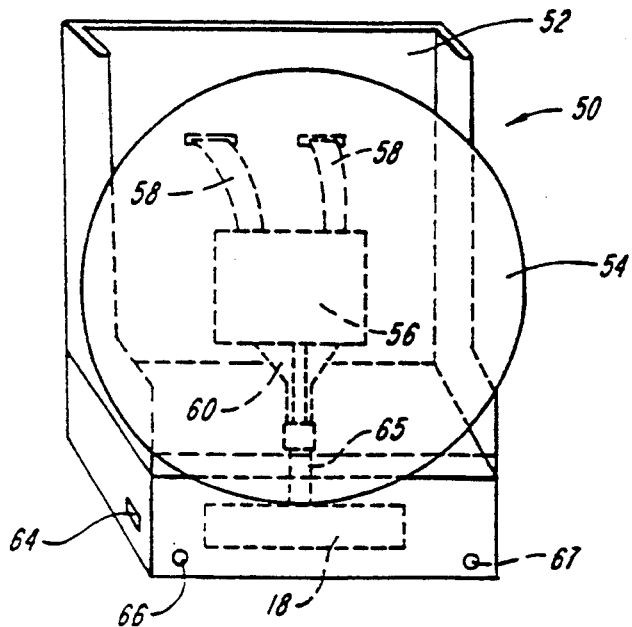
FIG. 8 is a perspective view of a child seat incorporating the restraint module of the present invention in its deployed state.

A third embodiment of the occupant restraint, suitable for protection of a child, is show in FIG. 8, wherein a child safety seat 50 combines a child sized seat 52 having straps 58 and a pad 60 similar to those in the present art, with the superior impact protection of an airbag 54 deployed from a restraint module 56 which produces reactionary forces. The restraint module 56 may be attached to the seat 52 as an aftermarket add-on, as a vehicle independent seat manufactured with the restraint module 56 or as a seat having a restraint module 56, but vehicle dependent for either acceleration sensing or airbag inflation.

The restraint module 56 when used as an aftermarket add-on to prior art child seats is entirely self contained. The restraint module 56 contains the airbag 54, acceleration sensors 61, the high pressure gas generator 18, and optional microprocessor 19 as described with respect to FIGS. 1-3. It should be understood that the high pressure gas generator 18 may be, but is not necessarily, a gas filled cylinder. It may be a device for releasing highly compressed gas, gas formed from rapidly combining chemicals, or gas produced in a pyrotechnic discharge. The restraint module 56 is attached to the straps 58 and/or pad 60 which serve to restrain the child within the seat 52. Alternatively, the straps 58 and/or pad 60 of the seat 52 may be removed and replaced with an aftermarket system having straps 58 and/or a pad incorporating the restraint module 56. The resulting child safety seat 50, thus configured is triggered in response to a firing signal from an acceleration sensor 61 and/or a pressure sensor 63 mounted on or in the restraint module. Upon activation, the high pressure gas generator 18 generates reactionary forces against the occupant 32 during airbag 54 inflation as described with respect to FIG. 2.

In another embodiment, the child safety seat 50 is designed for manufacture as an integral, vehicle independent seat. In this embodiment the child safety seat 50 may have the high pressure gas generator housed in the body of the seat 52, either under the seat 52 as depicted in FIG. 8, behind it or to one of the sides. When activated, the rapidly expanding gas is conducted to the airbag 54 via an appropriately sized tube 65. Additionally, the child safety seat 50 has an arming switch 64 located in a position inaccessible to the child. The child safety seat 50 may be equipped with pressure or weight sensors (not shown) to prevent arming of an unoccupied seat and indicator flags or lights 66 which signal the activation state of the seat. For example, a red indicator light 66 indicates that the system is turned on, and a second green indicator light 67 then illuminates when the module 56 is secured in place and weight is on the seat.

Figure 9:
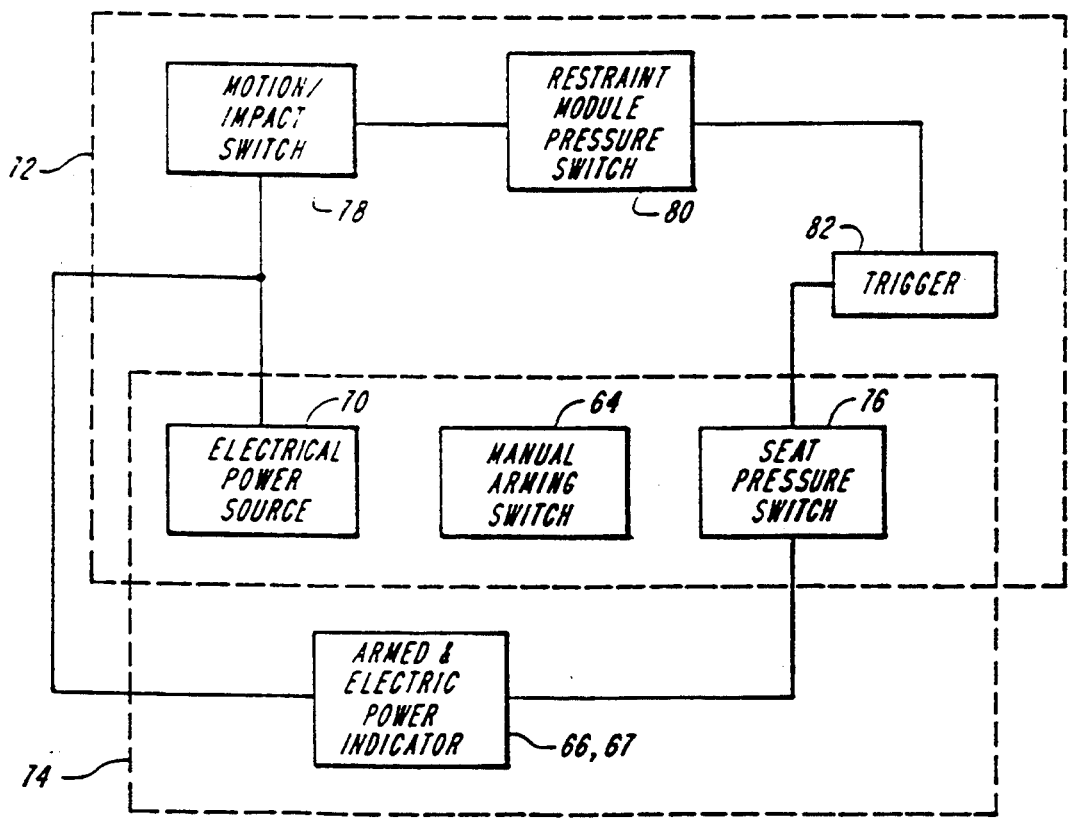
FIG. 9 is a block diagram of a sensing, arming and indicating system for use,.in the embodiment of FIG. 8.

FIG. 9 illustrates the circuit logic for electrical arming of the child safety seat 50 and is useful in describing the operation and activation of the seat. An electrical power source 70, such as a battery powers both a trigger circuit 72 and an arming status circuit 74. The trigger circuit 72 has several points of interruption on each side of the circuit 72 which act as safety features to prevent inadvertent airbag 54 deployment. To complete one side of the trigger circuit 72, which outputs a signal to activate the high pressure gas generator 18, the manual arming switch 64 must be in the "on" or contact position and the seat pressure switch 76 closed, due to an occupant 32 in the child safety seat 50. The other side of the trigger circuit 72 is completed when the motion-/impact switch 78, as described more fully with respect to FIGS. 1 and 2, and the restraint module pressure switch 80 are closed. Thus, when both sides of the trigger circuit 72 are closed, electrical current flows to the trigger 80 which activates the high pressure gas generator 18. A wide variety of switches are compatible with this invention, with solid state switches and piezoelectric pressure sensors having particular applicability.

The arming status circuit 74 provides an indication to the person placing an infant into the child safety seat 50 whether the seat 50 is armed or not. The arming status circuit 74 provides power to the red 66 and green 67 indicator lights when the manual arming switch 64 is on and the seat pressure switch 76 is closed.

Figure 10:
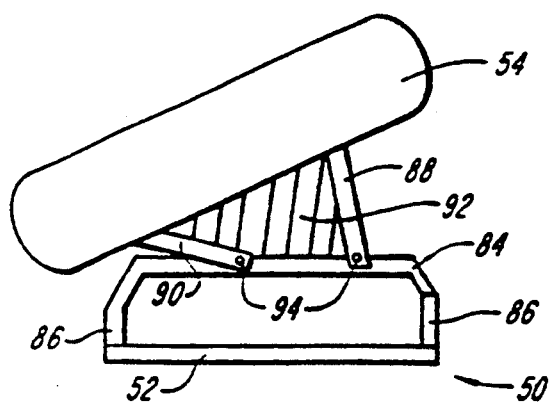
FIG. 10 is a top view of the device of FIG. 8 incorporating an adjustable restraint module which affords enhanced lateral protection.

Referring now to FIG. 10, a top view of an embodiment of the child safety seat 50 is shown with a modification to enhance protection of the occupant 32 from lateral impacts. In this embodiment, the seat 52 has, in addition to straps 58 and/or a pad 60, a rail or tray 84 extending out from the sides 86 of the seat 52 which passes in front of the occupant's torso. The restraint module 56 being flexibly attached to one end of each telescoping arm 88 and 90 along the back or sides of the restraint module 56 with a mechanical hinge, pivot joint, or elastomeric material, is attached to the rail or tray 84 with the other end of each telescoping arm 88 and 90 with lockable pivot joints 94 which allow the restraint module 56 to be oriented to the right, left or center of the child safety seat 50. Alternatively, the telescoping arms 88 and 90 may be attached directly to the seat 52, thus obviating the need for a supplemental rail or tray 84. Additionally, either an elastomeric pad 92 may be placed between the telescoping arms 88 and 90 on the back of the restraint module 56, or the airbag 54 may be shaped to inflate rearward around and between the arms.

In FIG. 10 the restraint module 56 is positioned to the left to better protect the occupant 32 in the left rear seat from left side impact. When the child safety seat 50 is installed on the right side of a vehicle, in either the front or rear seat, the restraint module 56 is swung to the right side and locked into position. When moving from side to side the telescoping arms 88 and 90 are free to extend and retract as required for movement, but when the restraint module 56 is aligned as desired, an internal mechanism (not shown) is engaged to fix the length of the arms 88 and 90 when the pivot joints 94 are locked. For use in the center of a front or rear seat when lateral impact protection might not be a primary consideration, the arms 88 and 90 are retracted an equal amount to center the restraint module 56 which then operates in the manner described with respect to FIG. 8.

Figure 11:
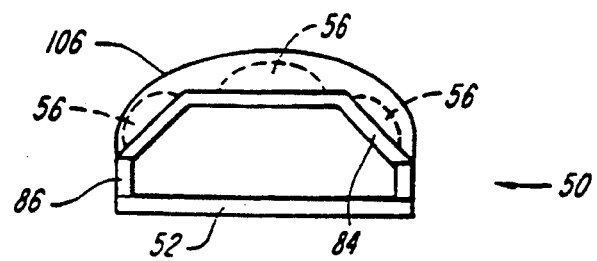
FIG. 11 is a top view of the device of FIG. 8 incorporating multiple restraint modules for enhanced lateral protection.

With reference to FIG. 11, another embodiment of the present invention is shown for protection of an occupant 32 from lateral impact. A seat 52, having sides 86 and rail or tray 84, is depicted with three restraint modules 56 affixed to the rail or tray 84. The restraint modules 56 are shown encased in a optional lightweight rail cushion 106 which serves to protect the restraint modules 56 and to provide low cost aesthetic variation. The restraint modules 56 in this figure are completely self contained and incorporate multi-axis acceleration sensors 61 which are responsive to both frontal and lateral impacts, an airbag 54 and a high pressure gas generator 18. As with the child safety seat of FIG. 8, this embodiment using self-contained restraint modules 56 is suitable for sale in the aftermarket.

Figure 12:
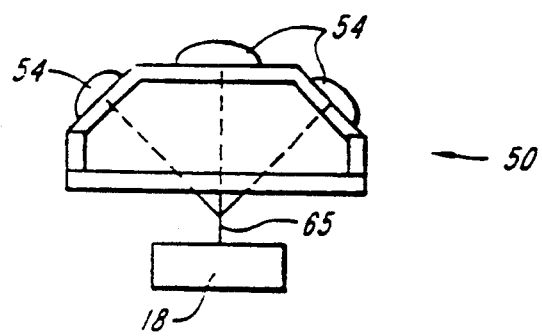
FIG. 12 is a further embodiment of the device of FIG. 11.
Figure 13:
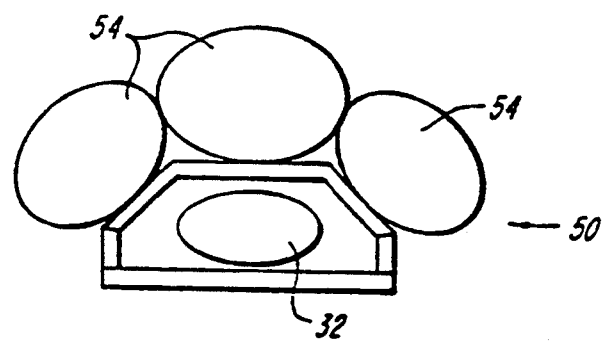
FIG. 13 is a top view of the device of FIGS. 12 and 13 in its fully deployed state.

FIG. 12 depicts a child safety seat 50 with a single high pressure gas generator 18 in communication with three airbags 54 mounted on the rail or tray 84. In this figure, the optional rail cushion 106 is not installed. The child safety seat of FIG. 12 includes sensors 61 and microprocessor 19 (not shown) in addition to the high pressure gas generator 18, as more fully described with respect to FIG. 9. While the drawing depicts a single tube 65 which is has branches going to each airbag 54 from the high pressure gas generator 18, completely individual tubes 65 connected to individual high pressure gas generators 18 may be employed. It is also contemplated that gas output be sequentially directed by the microprocessor 19, as a function of impact direction, through a control valve or valves (not shown) so as to inflate one or more airbags 54 prior to the others. Alternatively, the tubes 65 run from one airbag 54 to the others where, for example, the center airbag 54 upon inflating to its predetermined fill volume, directs the continued influx of gas to the left and right side airbags 54. This order can be altered either through programming of the microprocessor 19 with a simple user control pad (not shown) on the seat designating center, left or right airbag 54 inflation priority. As with the other embodiments, each restraint module 56 generates reactionary forces. Thus, when multiple restraint modules 56 are employed, multiple reactionary forces are generated along the appropriate axis to retard the movement of the occupant 32 into the airbags 54. FIG. 13 depicts the child safety seat 50 with all three airbags 54 inflated to surround the occupant 32. The integral, and therefore portable, child safety seat 50 thus described may be used in any type of conveyance, such as airplanes, buses, trains or trucks, where a frontal or lateral impact protection system is not available or needs to be supplemented.

Figure 14:
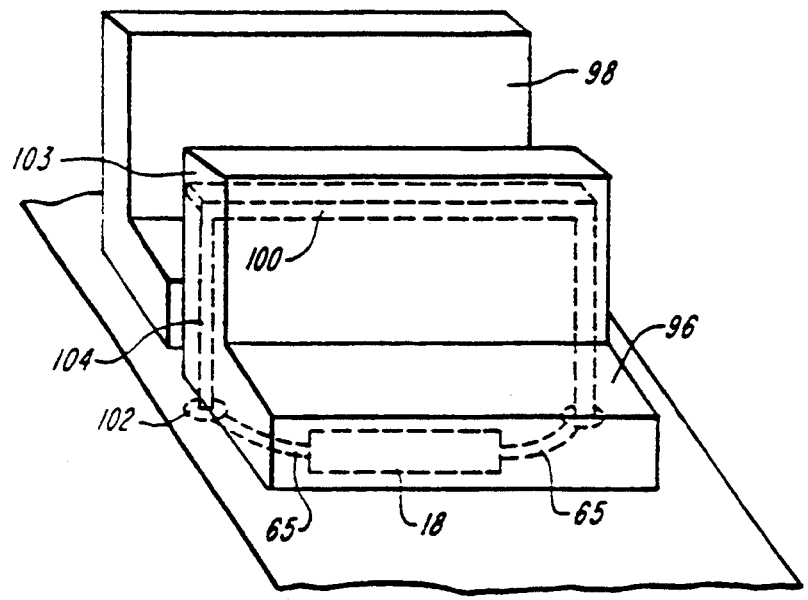
FIG. 14 is a perspective view of an embodiment of the present invention for protection of rear seat occupants.

With respect now to FIG. 14 another embodiment of the inflatable occupant restraint is shown for use in a rear seat of a vehicle. This embodiment is primarily intended as a self-contained aftermarket addition to taxis and limousines, but is equally useful for private automobile use as well as in airplanes, helicopters, trains and buses. FIG. 14 depicts the interior of a car with front 96 and rear 98 bench style seats. Behind the front seat 96 an elongated restraint module 56 is incorporated into a restraint rail 100. The restraint rail 100 may be tilted forward towards the front seat 96 to allow passenger ingress, and then tilted back over the passenger's lap or in close proximity to the torso of the passenger. It is envisioned that a work surface 103 can be detachably affixed to the restraint rail 100 as desired. The rail 100 may be articulated at the floor level of the vehicle or at any point along the side tubes 104 of the restraint rail 100 with hinges 102. Furthermore, the high pressure gas generator 18 may be located in one of the side tubes 104 or high pressure gas generators 18 may be placed in each, both of which responsive to the trigger 82 of the trigger circuit 72. Supplemental floor mounted pressure sensors 106 may also be incorporated as shown to inhibit inadvertent system activation.

Inflation of the airbag 54 is triggered, and reactive forces are generated in the same manner as described with respect the preceding embodiments. When inflation of the airbag 54 is triggered, the airbag inflates away from the occupant 32, thus pushing the restraint rail 100 and optional work surface 103 away from the occupant, flush against the front seat back or into a recess designed to receive it.

Figure 15:
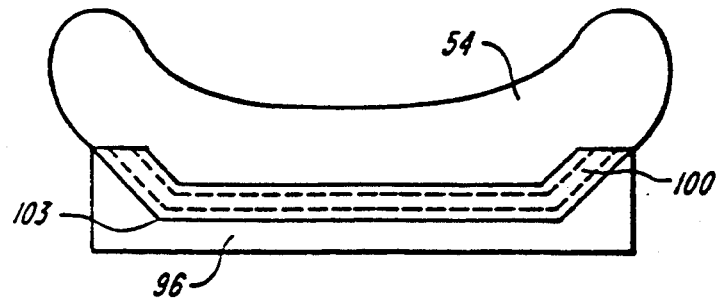
FIG. 15 is an overhead view of the embodiment of FIG. 11 in its deployed state.

FIG. 15 is an overhead view of the inflatable occupant restraint described in FIG. 14 with its airbag 54 deployed. In this view the restraint rail 100 containing the restraint module 56 is shown with work surface 103 installed, pushed forward into a recess in the back of the front seat 96. The airbag 54 is shaped so that when inflated, the sides of the airbag 54 inflate between the occupant 32 and the vehicle side for enhanced protection from lateral impact. It is important to note that in this embodiment, as with the others, the restraint module 56 is positioned sufficiently close to the occupant 32 (or occupants) so that the reactive forces serve to attenuate impact forces in addition to providing the cushioning of the airbag 54.

Figure 16:
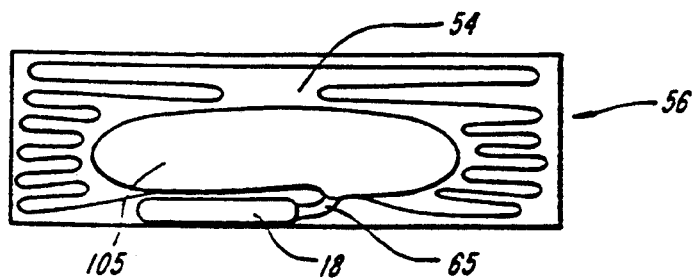
FIG. 16 is a cross-sectional view of an embodiment of the present invention having a preinflated cushion within the airbag prior to deployment.
Figure 17:
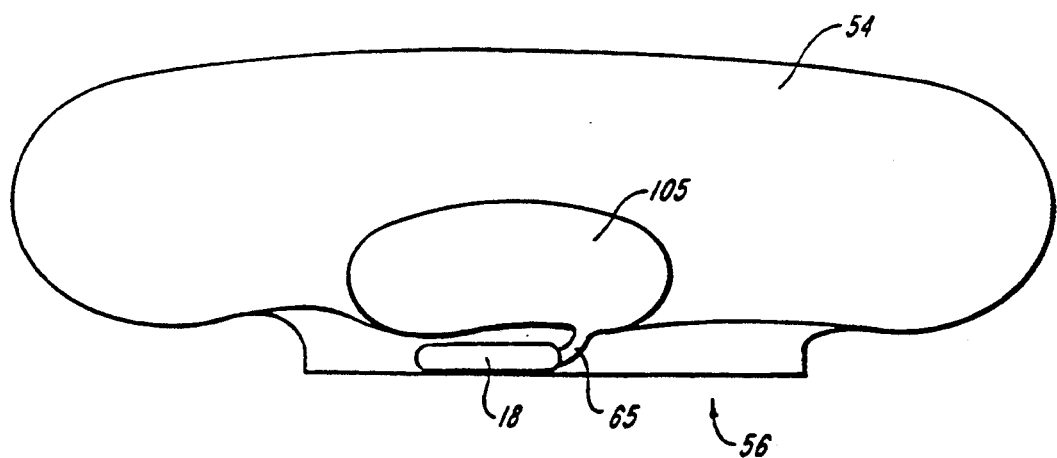
FIG. 17 is a cross-sectional view of the embodiment of FIG. 13 after deployment.

Turning now to FIG. 16, another embodiment of the restraint module 56 of the present invention is shown, wherein the uninflated airbag 54 contains, and is packed inside the restraint module 56 around, a preinflated cushion 105. The preinflated cushion 105 provides a portion of the inflation gas to the airbag 54 as a function of the volume it displaces within the airbag 54. The remainder of the gas is furnished by the high pressure gas generator 18 upon triggering of the system. The preinflated cushion 105 may be connected directly to tube 65 which is the gas conduit from the high pressure gas generator 18. In this arrangement, the sudden influx of gas causes the preinflated cushion 105 to burst, thus releasing both the "old" gas from the preinflated cushion 105 and the "new" gas from the high pressure gas generator into the airbag 54. In a different arrangement, the tube 65 is routed directly into the airbag 54, bypassing the preinflated cushion 105, and results in an inflated airbag 54 with an intact preinflated cushion 105 inside of it as depicted in FIG. 17. In the event of system failure, the preinflated cushion 105 within the restraint module 56 provides partial protection of the occupant 32 subjected to impact forces.

Figure 18:
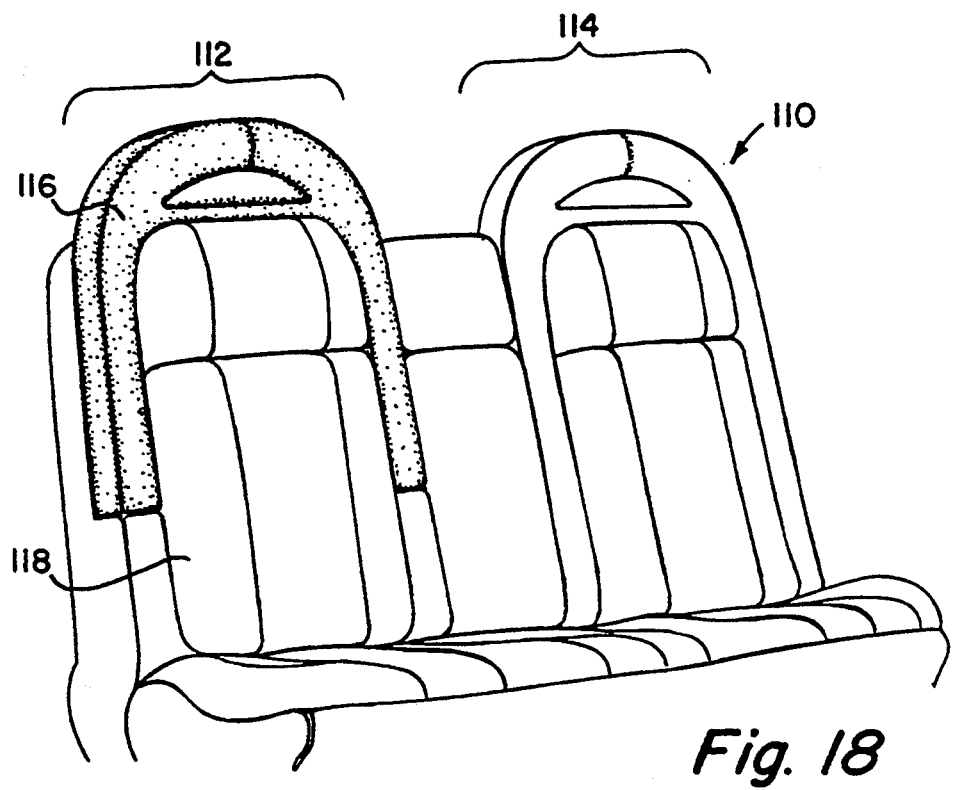
FIG. 18 is a perspective view of a convertible passenger seat.

Referring to FIG. 18, a vehicle seat 110 is shown that is convertible from an adult configuration to a child configuration. The illustrated seat 110 is a bench style seat having two primary seating areas 112 and 114, respectively, and is suitable for use in the front or rear of an automobile, truck, van. Although the features are illustrated and described with respect to a single seating area 112, the same features can be incorporated into the other seating area 114. Furthermore, the seat 110 can be configured as a single place "bucket" seat, typically installed in cars or airplanes, without altering the inventive concept of the seat 110.

The seat 110 illustrated in FIG. 18 is shown in a configuration for an adult passenger and is fully compatible with conventional restraint devices such as lap and torso belts (not shown). These restraints, however, are woefully inadequate for restraining and protecting infants and children during sudden stops or vehicular collisions. Accordingly, the seat 110 incorporates movable elements, such as a restraint device 116 and a cushion 118, that function as a headrest and a lower portion of a backrest, respectively, in the adult configuration, yet function quite differently in the child configuration.

Figure 19:
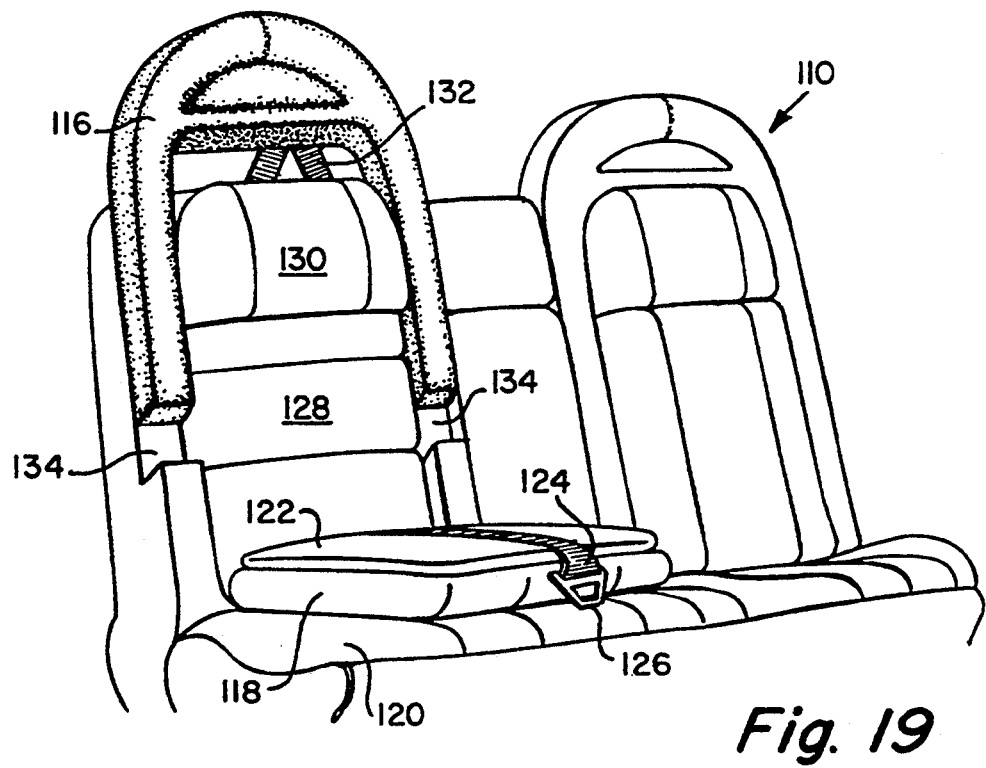
FIG. 19 is a perspective view of the convertible passenger seat of FIG. 18, illustrating transition of the seat from an adult configuration to a child safety seat.

Referring to FIG. 19 the seat 110 is shown in a preparatory configuration for restraining a child passenger. The cushion 118 is pulled downward onto the primary or adult seating surface 120 to form a raised secondary or child seating surface 122. Lowering the cushion 110 exposes a lower restraint belt 124 having a buckle 124, and a secondary or child backrest 128.

The upper portion of the adult backrest 130 is headrest for a child in the child configuration. The restraint device 116 is pulled upward to extract upper restraint belts, such as shoulder belts 132, from an inertia reel (not shown), and to disengage the restraint device 116 from upward position locking joints (134). Thus unlocked, the restraint device 116 can be rotated downward to a passenger restraint position, thereby further extracting the shoulder belts 132 from the inertia reel.

Figure 20:
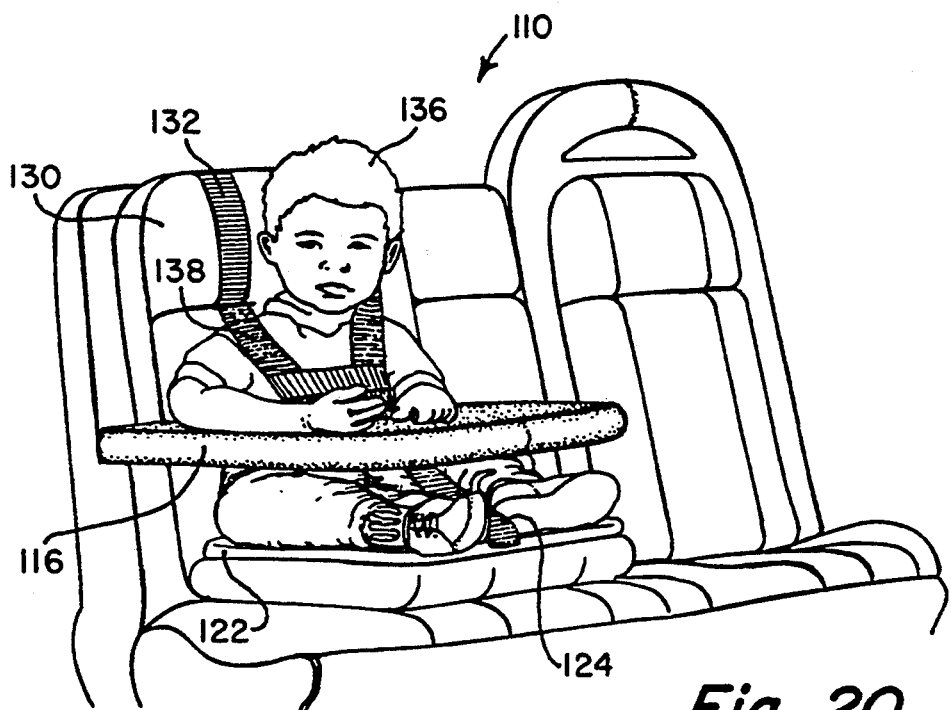
FIG. 20 is an illustration of seat of FIG. 18 in the child safety seat configuration, with a child restrained therein.

FIG. 20 illustrates a child passenger 136 restrained in the seat 110 in the child configuration. The passenger 136 is seated on the secondary seating surface 122, and the shoulder belts 132, lower restraint belt 124, and restraint device 116 are locked in place. The lower restraint belt 124 can be secured directly to the shoulder belts 132 or to the restraint device 116. To ensure that the shoulder belts 132 are positioned for optimal restraint and protection, belt guides 138 secure a portion of the shoulder belts 132 at an appropriate location in accordance with the size of the passenger 136. The belt guides 138 are made of a pliant material to prevent discomfort or injury to the child. Alternatively, the shoulder belts 132 can be configured so that they are extracted from slots in backrest. The padded restraint device 116 in its downward restraining position provides frontal and lateral restraint and protection, as well as an arm rest surface.

In a configuration for an older or larger child passenger 136, the cushion 118 remains in its upright position and the passenger sits on the primary seating surface 120. In this configuration, the passenger 136 is restrained with a conventional lap belt in conjunction with the restraint device 116 and shoulder belts 132.

Figure 21:
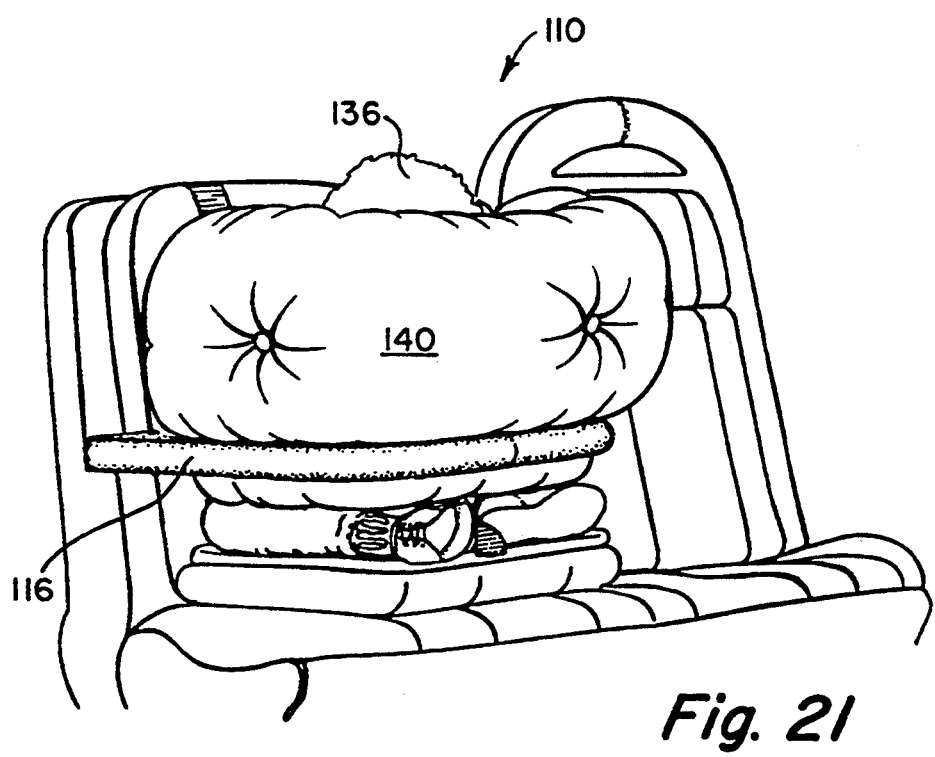
FIG. 21 is a perspective view of the seat of FIG. 18, illustrating airbag deployment.

In another embodiment, the seat 110 is provided with an inflatable occupant restraint, such as an airbag 140 shown deployed in FIG. 21 from its stored position within the restraint device 116. In one embodiment, the airbag 140 is a conventional airbag, and in another embodiment the airbag 140 is an airbag that produces reactive forces in accordance with the teachings described hereinabove with respect to FIGS. 1-17.

As with the airbag of FIGS. 1-17, the airbag 140 is inflated by a high pressure gas generator in communication with at least one sensor that detects either singly or in combination, vehicle impact, changes in acceleration, rapid pressure changes between the passenger 136 and the restraint device 116 to trigger inflation of the airbag 140. The various sensor signal outputs can be monitored and evaluated by a microprocessor that triggers airbag inflation in accordance with predefined parameters. Additionally, arming sensors can be included in the locking joints 134 to ensure that the airbag 140 does not deploy in its upward headrest position in the adult configuration.

Figure 22:
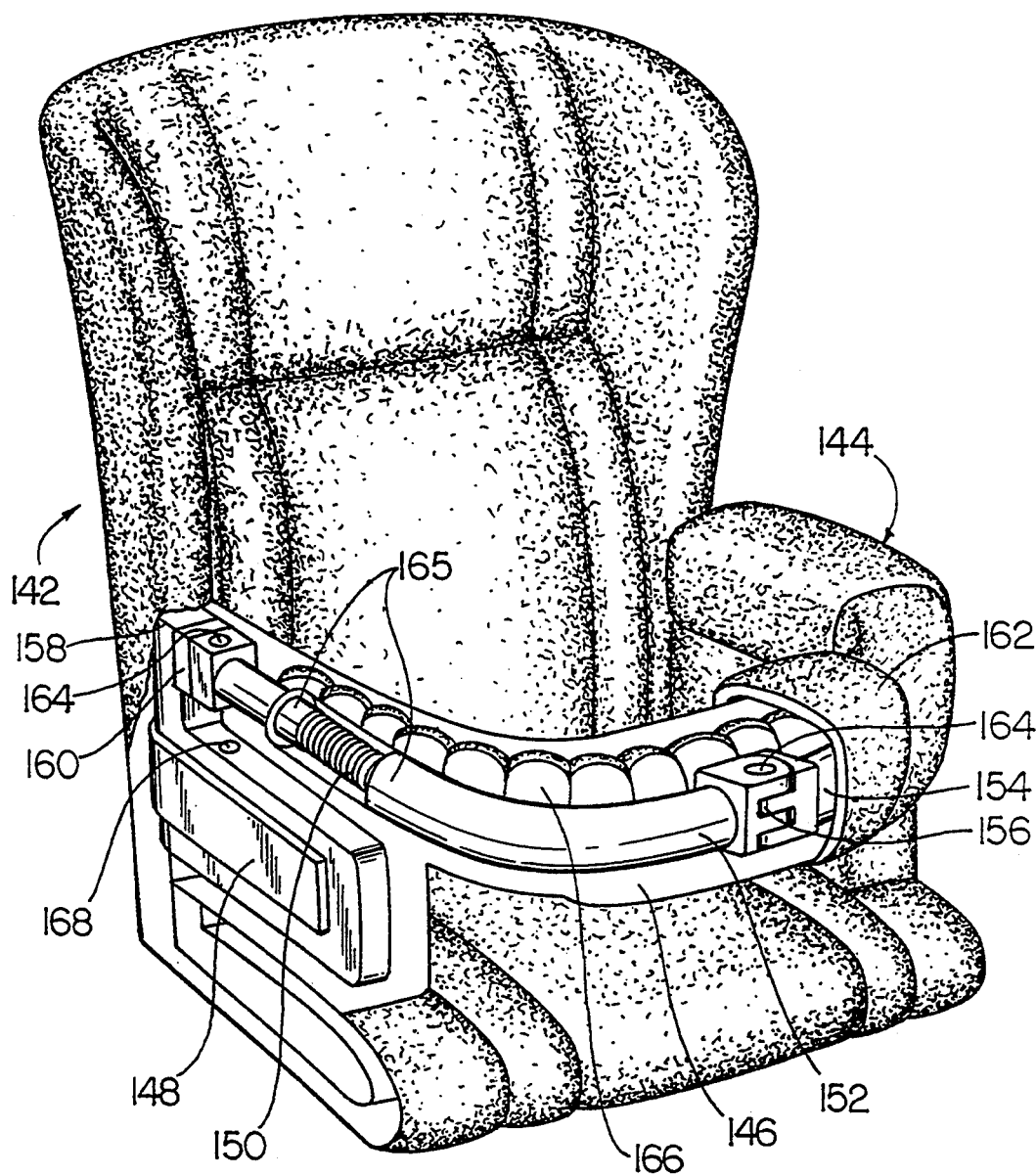
FIG. 22 is a perspective cut-away view of a child safety seat having an integral airbag and biasing means.

FIG. 22 illustrates yet another embodiment of a child safety seat 142 with an integral airbag. The child safety seat 142 is configured so as to be easily removable from a vehicle like the child safety seat 50 illustrated in FIG. 8, and is securable within a vehicle in the normal manner with the vehicle seat belt or belts. However, the child safety seat 142 is also configurable as a permanent vehicle seat. Like the vehicle seat 110 shown in FIGS. 18-21, the child safety seat 142 uses a cushioned restraint 144, similar to the restraint device 116, for restraining and protecting an occupant of the child safety seat 142, as well as for housing an airbag 146. The cushioned restraint 144 can be hinged upward to facilitate ingress or egress from the child safety seat 142. Supplemental restraining belts (not shown) are provided to further protect the occupant.

In addition to providing the safety advantages of restraining belts, a cushioned restraint 144, and an airbag 146, the child safety seat 142 includes biasing means to make the seat more resilient and less prone to cause injury resulting from bodily impact with fixed seat components. Biasing means suitable for use with the child safety seat 142 include leaf springs 148 and helical springs 150. The leaf springs 148 provide lateral biasing and the helical springs 150 provide fore and aft biasing. However, other biasing means known to those skilled in the art can be substituted for these springs. Additionally, elastomeric materials can be used in conjunction with springs to mitigate impact forces.

The cushioned restraint 144 includes a stiffening member, shown in the illustrative embodiment as first and second curved bars 152 and 154, respectively, for supporting external cushions and positioning the airbag 146. In this embodiment the first curved bar 152 is connected to the second curved bar 154 at a joint 156 that allows the bars to move with respect to each other. The bars 152 and 154 are connected to structural seat members 158 at joints 160 that allow each bar to move with respect to the structural seat members 158. Although only the first bar 152 and related structures are visible in the figure, similar structures are associated with the second bar 154 which is shown covered by padding 162. Each of the joints 156, 160 includes a shear pin 164 which breaks when a predetermined amount of force is applied to the cushioned restraint 144 and when the first and second bars 152, 154 reach predetermined movement limits, thus allowing the bars to separate from each other and from the structural seat members 158. The joints 156, 160 include biasing means to permit the cushioned restraint 144 to move laterally and rotationally with respect to the occupant of the child safety seat 142.

Although the cushioned restraint 144 has been described with respect to two connected curved bars 152, 154, it should be understood that the cushioned restraint 144 can comprise more segments or bars of various shapes and sizes as desired for a particular application. For example, each curved bar 152, 154 can include shear pins 165 used to couple the helical spring 150 to opposing segments of each bar to allow only the forward portion of the cushioned restraint 144 to separate from the child safety seat 142 when a predetermined force level is applied thereto.

The airbag 146 is disposed within the cushioned restraint 144 beneath the protective padding 162 in a manner so that the airbag 146 inflates outwardly from the cushioned restraint 144, away from the occupant of the child safety seat 142. Typically, the airbag 146 is positioned in front of the curved bars 152, 154, but it may also be wrapped around them. Expansion of the airbag 146 pushes the curved bars 152, 154 toward the occupant, thereby compressing the helical springs 150 and transmitting the reactionary force produced by inflation of the airbag 146 as described hereinabove to the occupant. Supplemental padding 166 is provided on the portion of the first and second bars 152, 154 facing the space occupied by the occupant for additional protection and to spread out the pushing surface.

Depending on the direction of impact, the reactionary force imparts a controlled impetus opposite the direction of the impact to the occupant to counter impact forces. For example, a pure frontal impact produces rearward push from the airbag 146; a lateral impact from the right produces a lateral push from the airbag 146 to the left, etc.

Combining the advantages of the reactionary forces and cushioning provided by the airbag 146 with the biasing means provided in the cushioned restraint 144 further enhances the protective benefits of the child safety seat 142. For example, during a frontal impact, the occupant initially moves forward and presses against the cushioned restraint 144. The helical springs 150 allow limited forward movement of the cushioned restraint 144 thereby absorbing some of the impact energy while the airbag 146 is inflating and providing a reactionary force. When the occupant presses against the cushioned restraint 144 hard enough to exceed the bias level of the helical springs 150, thus exceeding a predetermined safety level, the shear pins 165 break or shear, detaching the curved bars 152,154 from the structural seat members 158 thereby guiding the occupant into the airbag 146 which cushions impact forces.

A similar synergism is provided for the lateral component of impact forces, wherein the leaf springs 148 are deflected concurrent with a lateral reactionary force being applied by the airbag 146 until a lateral safety factor is exceeded. The appropriate leaf spring shear pin 168 fails and the occupant is guided into the airbag 146.

While only one airbag 146 is discussed with respect to the illustrated embodiment, it is to be understood that multiple airbags such as front, left, and right side airbags are compatible with the inventive concept as shown in FIG. 13. It should also be understood that the airbag 146 can configured to inflate in other than round or rectangular pillow shapes. In one embodiment, for example, the airbag inflates multidirectionally and achieves a "U" shape that surrounds the occupant during inflation as shown in FIG. 21.

As with the other embodiments, inflation of the airbag 146 of the child safety seat 142 is triggered by sensor input as described hereinabove. A processor is provided to compare sensor data to stored programmable values that include "time to required impact level" as a part of an "and" switching mechanism for triggering airbag inflation at the appropriate moment. The airbag 146 or airbags are inflatable with all of the gas generators previously described. The child safety seat 142 also includes an "arming/safety" mechanism as described hereinabove.

The presently described embodiments of an integral inflatable restraint system are illustrative of a novel apparatus for providing dynamic protection for the occupants of a moving vehicle. It will be appreciated that other modifications, embodiments and departures from the present disclosure are possible without departing from the inventive concept contained herein. Consequently, the invention is to be viewed as embracing each and every novel feature as well as any novel combination of features present in, or possessed by, the inflatable restraint system disclosed herein and is to be limited solely by the scope and spirit of the appended claims.

What is claimed is:

1. A child safety seat incorporating an airbag for protecting an occupant of said child safety set, comprising:
   a child seat having a backrest with a first and second side, said child seat further including a leaf spring extending substantially perpendicular from said backrest on each said first and second side;
   a restraint secured to said child seat; and
   an airbag housed in said restraint and deployable therefrom.

2. The child safety seat of claim 1, wherein said leaf spring is coupled to said backrest with a shear pin configured to break at a predetermined force level.

3. A child safety seat incorporating an airbag for protecting an occupant of said child safety seat, comprising:
   a child seat;
   a restraint secured to said child seat;
   biasing means joining said restraint to said child seat for allowing said restraint to move fore and aft with respect to said child seat in response to an impact situation to absorb impact energy; and
   an airbag housed in said restraint and deployable therefrom.

4. A child safety seat incorporating an airbag for protecting an occupant of said child safety seat, comprising:
   a child seat;
   a restraint secured to said child seat, said restraint including a first bar connected to a first child seat structural member at a first end by a first articulable joint, and a second bar connected to a second child seat structural member at a second articulable joint, a second end of said first bar and a second end of said second bar joined at a third articulable joint, each said first and second bar having a first portion and a second portion with a spring therebetween allowing said first portion to move longitudinally with respect to said second portion; and
   an airbag housed in said restraint and deployable therefrom.

5. The child safety seat of claim 4, wherein said airbag is "U" shaped and surrounds said occupant during inflation of said airbag.

6. The child safety seat of claim 4, wherein said airbag is housed within said restraint so as to inflate in a direction away from said occupant.

7. The child safety seat of claim 6, wherein inflation of said airbag imparts a reactive force to said passenger in a direction opposite the direction of inflation of said airbag.

8. The child safety seat of claim 4, wherein said inflation of said airbag pushes said restraint toward said occupant.

9. A child safety seat incorporating an airbag for protecting an occupant of said child safety seat, comprising:
   a child seat;
   a restraint connected by at least one shear pin to said child seat, said at least one shear pin breakable at a predetermined force level to separate said restraint from said child seat in a controlled manner; and
   an airbag housed in said restraint and deployable therefrom.

10. The child safety seat of claim 9, wherein said restraint is adapted to guide said occupant of said child seat into said airbag when at least one of said at least one shear pin breaks.

11. The child safety seat of claim 10, wherein said airbag is housed within said restraint so as to inflate in a direction away from said occupant.

12. The child safety seat of claim 11, wherein inflation of said airbag imparts a reactive force to said occupant in a direction opposite the direction of inflation of said airbag.

13. The child safety seat of claim 11, wherein said inflation of said airbag pushes said restraint toward said occupant.

14. A child safety seat incorporating an airbag for protecting an occupant of said child safety seat, comprising:
   a child seat;
   a restraint secured to said child seat;
   an airbag housed in said restraint and deployable therefrom; and
   a first child seat structural member on a first side of said child seat and a second child seat structural member on a second side of said child seat, said restraint further including a first bar connected to said first child seat structural member at a first end by a first joint and a second bar connected to said second child seat structural member at a second joint, a second end of said first bar and a second end of said second bar joined at a third joint so as to enclose said occupant within said child seat.

15. The child safety seat of claim 14, wherein each said first and second bar includes a first portion and a second portion with a spring therebetween allowing said first portion to move fore and aft with respect to said second portion.

* * * * *